(12) United States Patent
Cho

(10) Patent No.: US 10,615,538 B2
(45) Date of Patent: Apr. 7, 2020

(54) ELECTRONIC DEVICE WITH UNFOLDABLE CONNECTOR MODULE

(71) Applicant: Samsung Electronics Co., Ltd., Suwon-si, Gyeonggi-do (KR)

(72) Inventor: Hyun-Je Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/957,450

(22) Filed: Apr. 19, 2018

(65) Prior Publication Data

US 2018/0309232 A1 Oct. 25, 2018

(30) Foreign Application Priority Data

Apr. 25, 2017 (KR) .......................... 10-2017-0052971

(51) Int. Cl.
*H01R 13/60* (2006.01)
*G06F 1/16* (2006.01)
*H01R 13/62* (2006.01)

(52) U.S. Cl.
CPC .......... *H01R 13/60* (2013.01); *G06F 1/1654* (2013.01); *G06F 1/1656* (2013.01); *G06F 1/1683* (2013.01); *H01R 13/6205* (2013.01)

(58) Field of Classification Search
CPC .... H01R 13/60; H01R 11/30; H01R 13/6205; G06F 1/1654
USPC .......................................................... 439/39
See application file for complete search history.

(56) References Cited

U.S. PATENT DOCUMENTS

| | | | | |
|---|---|---|---|---|
| 5,144,290 A | * | 9/1992 | Honda .................. | G06F 1/1616 16/306 |
| 6,315,582 B1 | * | 11/2001 | Nishio ............... | H01R 13/2442 439/131 |
| 6,937,468 B2 | * | 8/2005 | Lin ........................ | G06F 1/1632 361/679.41 |
| 7,551,426 B2 | * | 6/2009 | Huang ................... | G06F 1/162 361/679.02 |

(Continued)

FOREIGN PATENT DOCUMENTS

| | | |
|---|---|---|
| EP | 2 677 391 A2 | 12/2013 |
| EP | 2 993 550 A1 | 3/2016 |

OTHER PUBLICATIONS

European Search Report dated Oct. 4, 2018, issued in European Application No. 18168980.3.

*Primary Examiner* — Tulsidas C Patel
*Assistant Examiner* — Peter G Leigh
(74) *Attorney, Agent, or Firm* — Jefferson IP Law, LLP

(57) ABSTRACT

An electronic device including an unfoldable connector module is provided. The electronic device includes a housing including a first surface facing in a first direction and a second surface facing in a second direction which is an opposite direction of the first direction, a recess formed in a side of the first surface and opened at least in the first direction, and a connector module disposed in the recess of the housing and having at least a portion unfoldable to an outside of the recess to electrically connect with an external electronic device. The electronic device has the connector structure placed inside the recess formed in one side thereof to avoid a cut shape from being shown on the outside surface, ensuring a simple and tidy design along with a better grip when carried.

20 Claims, 10 Drawing Sheets

(56) References Cited

U.S. PATENT DOCUMENTS

| | | | | |
|---|---|---|---|---|
| 7,599,178 B2* | 10/2009 | Huang | G06F 1/1632 | 361/679.28 |
| 7,692,919 B2* | 4/2010 | Liang | G06F 1/1616 | 361/679.29 |
| 8,323,040 B2* | 12/2012 | Prest | H01R 35/00 | 439/131 |
| 8,498,100 B1* | 7/2013 | Whitt, III | G06F 1/1618 | 361/679.17 |
| 8,508,923 B2* | 8/2013 | Chao | G06F 1/1616 | 361/679.02 |
| 8,599,542 B1* | 12/2013 | Healey | G06F 1/1626 | 345/168 |
| 8,873,227 B2* | 10/2014 | Whitt, III | G06F 1/1669 | 361/679.09 |
| 8,995,121 B2* | 3/2015 | Yen | G06F 1/1632 | 361/679.2 |
| 9,042,087 B2* | 5/2015 | Hung | G06F 1/1632 | 248/229.22 |
| 9,047,049 B2* | 6/2015 | Yang | G06F 1/1626 | |
| 9,075,566 B2* | 7/2015 | Whitt, III | G06F 1/16 | |
| 9,167,711 B2* | 10/2015 | Lee | G06F 1/1654 | |
| 9,223,344 B2* | 12/2015 | Wang | G06F 1/1632 | |
| 9,239,595 B2* | 1/2016 | Liang | H01R 13/6205 | |
| 9,256,256 B2* | 2/2016 | Liang | G06F 1/1632 | |
| 9,261,910 B2* | 2/2016 | Liang | G06F 1/1632 | |
| 9,268,373 B2* | 2/2016 | Whitt, III | G06F 1/16 | |
| 9,292,050 B2* | 3/2016 | Noguchi | G06F 1/1681 | |
| 9,312,633 B1* | 4/2016 | Szeto | H01R 13/6205 | |
| 9,317,072 B2* | 4/2016 | Park | G06F 1/1615 | |
| 9,367,088 B2* | 6/2016 | Chang | G06F 1/1632 | |
| 9,471,110 B2* | 10/2016 | Wu | G06F 1/1681 | |
| 9,727,092 B1* | 8/2017 | Gerbus | G06F 1/1681 | |
| 9,740,240 B1* | 8/2017 | Matsumoto | G06F 1/1632 | |
| 2005/0207112 A1* | 9/2005 | Bakker | G06F 1/1632 | 361/679.41 |
| 2006/0067036 A1* | 3/2006 | Lin | G06F 1/162 | 361/679.06 |
| 2012/0275092 A1* | 11/2012 | Zhou | F16M 13/00 | 361/679.01 |
| 2013/0170126 A1* | 7/2013 | Lee | G06F 1/1675 | 361/679.17 |
| 2014/0133080 A1* | 5/2014 | Hwang | G06F 1/1632 | 361/679.17 |
| 2014/0193193 A1* | 7/2014 | Wikander | G06F 1/1616 | 403/322.1 |
| 2014/0204515 A1* | 7/2014 | Whitt, III | G06F 1/1618 | 361/679.4 |
| 2014/0247546 A1 | 9/2014 | Whitt, III et al. | | |
| 2014/0313665 A1* | 10/2014 | Delpier | G06F 1/1616 | 361/679.55 |
| 2014/0328014 A1* | 11/2014 | Lan | G06F 1/1681 | 361/679.27 |
| 2015/0098182 A1* | 4/2015 | Liu | G06F 1/1681 | 361/679.55 |
| 2015/0185783 A1* | 7/2015 | Hui | G06F 1/1656 | 361/679.29 |
| 2015/0192957 A1* | 7/2015 | Lee | G06F 1/1632 | 361/679.58 |
| 2015/0198980 A1* | 7/2015 | Aoki | G06F 1/1616 | 361/679.17 |
| 2015/0205330 A1* | 7/2015 | Zhang | G06F 1/1626 | 361/679.3 |
| 2015/0227212 A1* | 8/2015 | Whitt, III | G06F 3/0202 | 341/22 |
| 2015/0268696 A1* | 9/2015 | Wu | G06F 1/1632 | 361/679.43 |
| 2015/0281413 A1 | 10/2015 | Longo et al. | | |
| 2016/0062484 A1* | 3/2016 | Sugiura | G06F 3/0202 | 345/156 |
| 2016/0187933 A1* | 6/2016 | Nelson | G06F 1/1681 | 361/679.11 |
| 2017/0003719 A1* | 1/2017 | Siddiqui | E05D 1/04 | |
| 2017/0060180 A1* | 3/2017 | Griffin, II | G06F 1/1607 | |
| 2017/0068286 A1* | 3/2017 | Esmaeili | G06F 1/1684 | |

* cited by examiner

ELECTRONIC DEVICE WITH UNFOLDABLE CONNECTOR MODULE

CROSS-REFERENCE TO RELATED APPLICATION(S)

This application is based on and claims priority under 35 U.S.C. § 119 of a Korean Patent Application No.10-2017-0052971, filed on Apr. 25, 2017, in the Korean Intellectual Property Office, the disclosure of which is incorporated by reference herein in its entirety.

BACKGROUND

1. Field

The disclosure relates to electronic devices with a connector module that is positioned inside the electronic device when the electronic device is carried and that is externally unfoldable when the electronic device is combined with an external electronic device.

2. Description of the Related Art

The term "electronic device" may mean a device performing a particular function according to its equipped program, such as a home appliance, an electronic scheduler, a portable multimedia player, a mobile communication terminal, a tablet PC, a video/sound device, a desktop PC or laptop computer, a navigation for automobile, etc. For example, electronic devices may output stored information as voices or images. As electronic devices are highly integrated, and high-speed, high-volume wireless communication becomes commonplace, electronic devices, such as mobile communication terminals, are recently being equipped with various features. For example, electronic devices come with the integrated functionality, including an entertainment function, such as playing video games, a multimedia function, such as replaying music/videos, a communication and security function for mobile banking, and a scheduling or e-wallet function. Electronic devices are manufactured more compact for easier carrying and with a better design to fit customers' needs.

Among such electronic devices, input-centered electronic devices may detachably be coupled with output-centered electronic devices in which case various types of couplings may be applied to join the electronic devices. The couplings may come in rotatable, slidable, and swingable types. Among others, rotatable couplings are most favored in light of easier production, less malfunctions, and more convenient use.

In a rotatable coupling structure used in electronic devices, its connector part is exposed to the outside for storage and maintaining connection between an input-centered electronic device and an output-centered electronic device. This way leaves a cut shape on the outside surface of the electronic devices, posing limitations on shaping along with a poor aesthetic and grip.

Furthermore, the external exposure of the connector part which is provided separately may cause a short circuit and contamination.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method in an electronic device, a connector module is placed inside a recess in a side of the electronic device not to reside on the outer surface, thereby delivering a simple and organized look and better grip.

Another aspect of the disclosure, an electronic device with a connector module may easily be unfolded over multiple times, enabling a coupling with an electronic device with a display unit and convenient angle adjustment.

In accordance with an aspect of the disclosure, an electronic device is provided. The electronic device includes a housing including a first surface facing in a first direction and a second surface facing in a second direction which is an opposite direction of the first direction, and a recess formed in a side of the first surface and opened at least in the first direction and a connector module disposed in the recess of the housing and having at least a portion unfoldable to an outside of the recess to electrically connect with an external electronic device.

The connector module may include an unfoldable part having a first portion coupled to an inside of the recess and a second portion unfolded to the outside of the recess as at least one rotating part rotates, a magnet disposed in the unfoldable part, at least one metal piece disposed opposite the magnet and induces a magnetic coupling with the magnet, and a connector part exposed to the outside to connect with the external electronic device as the unfoldable part unfolds.

In accordance with an aspect of the disclosure, an electronic device is provided. The electronic device includes a housing including a first surface facing in a first direction and a second surface facing in a second direction which is an opposite direction of the first direction, the housing including a recess formed in a side of the first surface and opened at least in the first direction and a connector module disposed in the recess of the housing and having at least a portion unfoldable to an outside of the recess to electrically connect with an external electronic device.

The connector module may include an unfoldable part having a first portion coupled to an inside of the recess and a second portion unfolded to the outside of the recess as at least one rotating part rotates, a first magnetic body disposed in the unfoldable part, a second magnetic body disposed opposite the magnet and induces a magnetic coupling with the first magnetic body, and a connector part exposed to the outside to connect with the external electronic device as the unfoldable part unfolds, and wherein at least one hole may be formed in an area abutting the recess in the first surface of the housing.

In accordance with an aspect of the disclosure, an electronic device is provided. The electronic device includes a first electronic device including a display, a housing including a first surface facing in a first direction and a second surface facing in a second direction which is an opposite direction of the first direction, the housing including a recess formed in a side of the first surface and opened at least in the first direction, and a connector module disposed in the recess of the housing and having at least a portion unfoldable to an outside of the recess to electrically connect with the first electronic device.

The connector module may include an unfoldable part partially unfolding to the outside of the recess as at least one rotating part rotates, a magnet disposed in the unfoldable part, at least one metal piece disposed opposite the magnet and configured to induce a magnetic coupling with the magnet, and a connector part exposed to the outside to connect with the external electronic device as the unfoldable part unfolds.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
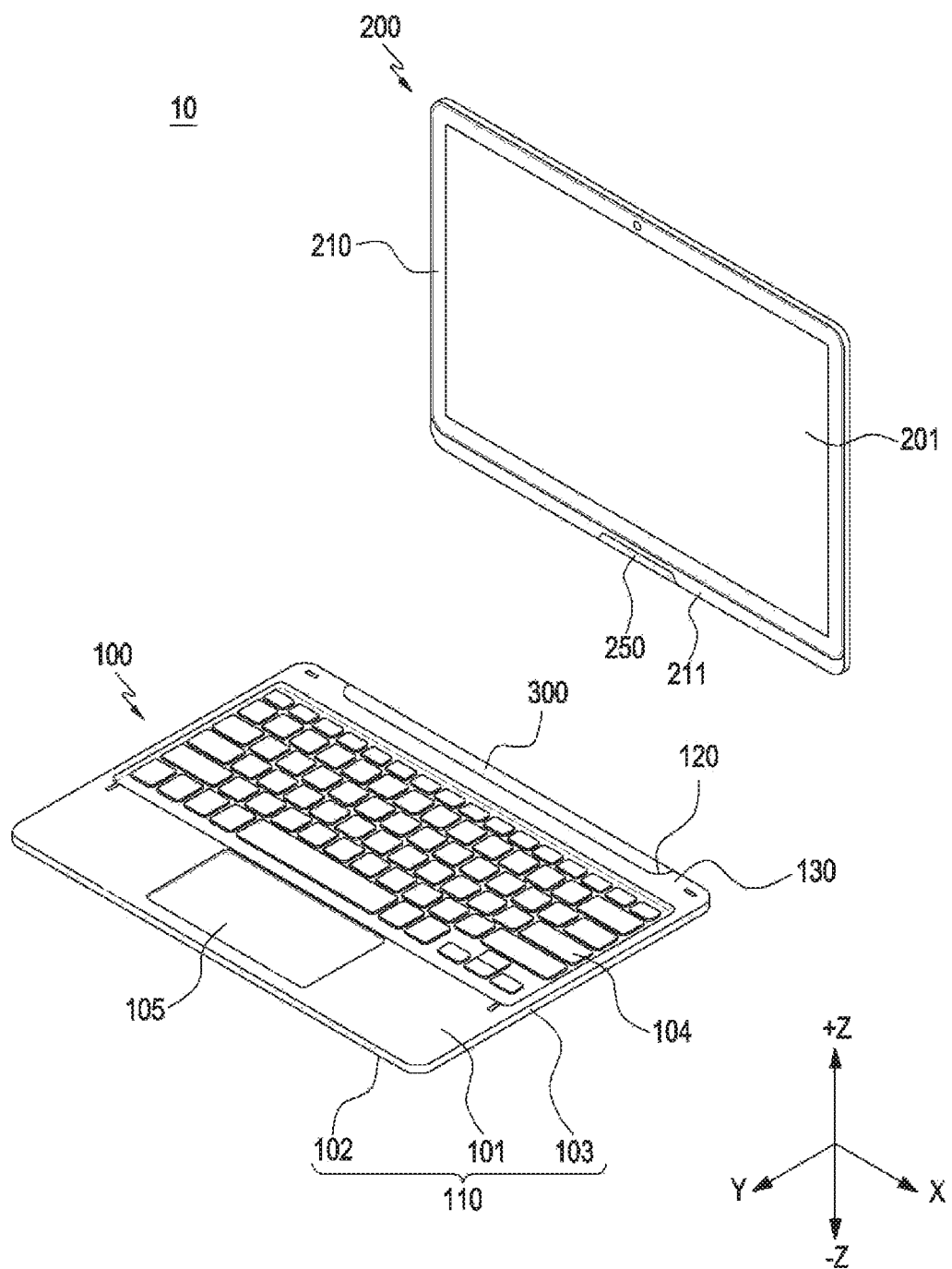
FIG. 1 is a perspective view illustrating a portable electronic device 10 including an unfoldable connector module 300 according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the disclosure, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

FIG. 1 is a perspective view illustrating a portable electronic device 10 including an unfoldable connector module 300 according to an embodiment of the disclosure.

In the three-axis rectangular coordinate system as shown in FIG. 1, 'X,' 'Y,' and 'Z,' respectively, may denote the length, width, and height directions of the electronic device 10. According to an embodiment of the disclosure,'Z' may mean a first direction (+Z) or a second direction (−Z).

Referring to FIG. 1, the electronic device 10 may include a first electronic device 100 and a second electronic device 200 detachably coupled via a connector module 300 disposed inside the first electronic device 100. The connector module 300 may be a structure to rotatably couple the second electronic device 200 to the first electronic device 100 and may be mounted in some area of the first electronic device 100.

According to an embodiment of the disclosure, the first electronic device 100 may include a data input unit, e.g., a keypad device aiding in input tasks such as typing to deliver data to the first electronic device 100. A plurality of input keys 104 may be provided on a portion of the top surface 101 that faces in the first direction +Z of the first electronic device 100 and so may be a touchpad 105 that may replace the mouse feature. The user may perform entry of data, which is to be displayed or stored in the second electronic device 200, using the first electronic device 100 in a more quick and convenient way.

According to an embodiment of the disclosure, the second electronic device 200 may be a portable device having a computing system and an image display means integrated together, e.g., a table computer. The second electronic device 200 may include a data input unit, a data output unit, and/or a data input/output unit. For example, the data input unit may be an input device such as a touchpad, and the data output unit may be a display unit such as a display device. The data input/output unit may be a device such as a touchscreen.

According to an embodiment of the disclosure, the second electronic device 200 may include a housing 210 with a transparent window 201. A display may be placed inside the housing 210 to display external information through the transparent window 201. The housing 210 may be an element for receiving various electronic parts. At least part of the housing 210 may be formed of a conductive material. For example, the housing 210 may include side walls forming the outside surface of the second electronic device 200. The part of the second electronic device 200 exposed to the outside may be formed of a conductive metal. A printed circuit part (not shown) and/or a battery (not shown) may be received inside the housing 210. For example, a processor, a communication module, various interfaces, and a power management module may be mounted on the printed circuit board in the form of an integrated circuit (IC) chip. For example, a control circuit may also be configured in an IC chip and mounted on the printed circuit part. For example, the control circuit may be part of the processor or the communication module. The battery may be placed inside the housing 210 to secure power.

According to an embodiment of the disclosure, on an upper end portion 130 of the first electronic device 100, which faces in the first direction +Z may be disposed a connector module 300 for coupling with the second electronic device 200. The connector module 300 may extend in the lengthwise direction +X or X of the first electronic device 100. When the user uses the first electronic device 100, at least part of the connector module 300 disposed in the first electronic device 100 may be inserted into an end of the second electronic device 200 to electrically connect the first electronic device 100 with the second electronic device 200. Since the second electronic device 200 may be coupled to the first electronic device 100 detachably, rather than fixedly, the second electronic device 200 may easily be removed from the first electronic device 100 when the user so desires. As another example, the first electronic device 100 and the second electronic device 200 may remain coupled together via the connector module 300 when carried and/or stored.

The connector module 300 unfoldable between the first electronic device 100 and the second electronic device 200 is described below in greater detail.

Figure 2:
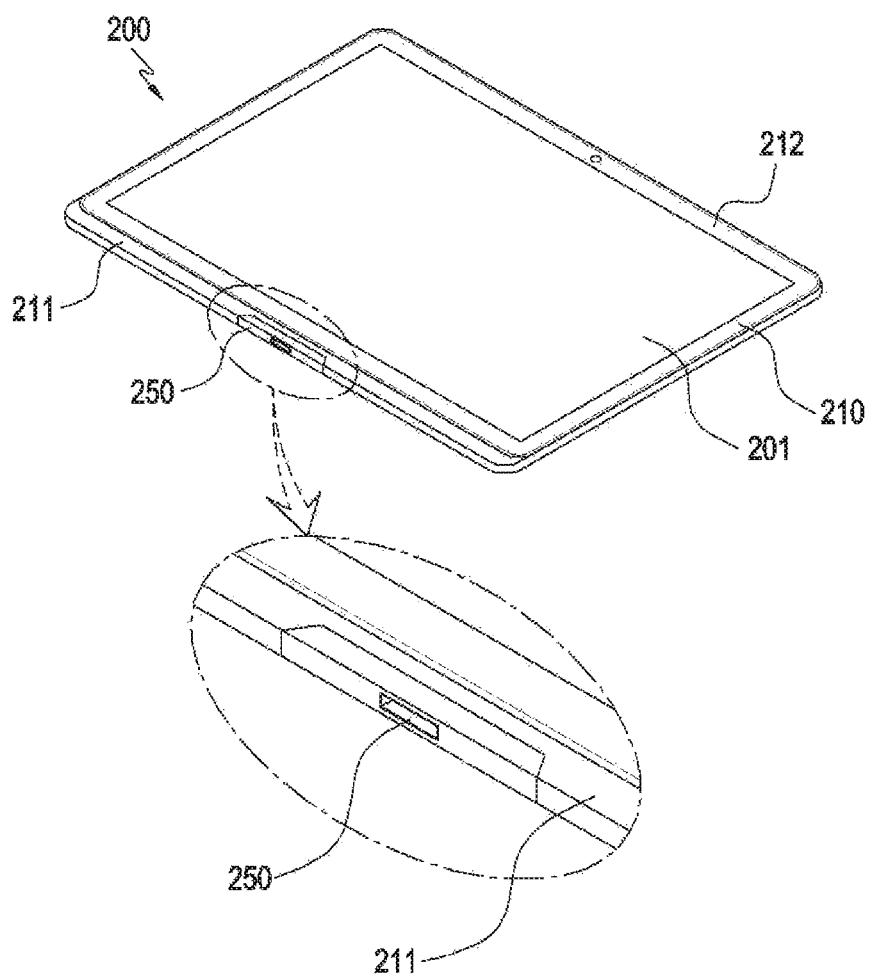
FIG. 2 is a perspective view illustrating a second electronic device 200 of a portable electronic device 10 according to an embodiment of the disclosure.

FIG. 2 is a perspective view illustrating a second electronic device 200 of a portable electronic device 10 according to an embodiment of the disclosure. The structure of the second electronic device 200 shown in FIG. 2 may be the whole or part of the structure of the second electronic device 200 of FIG. 1.

Referring to FIG. 2, at least one connector structure 250 may be included in a lower end portion 211 of the second electronic device 200. For example, the connector structure 250 may be formed on the edge surface at the lower and center of the second electronic device 200, with its connecting terminals placed inside. The connector structure 250 may be configured with a hole allowing the above-described connector module (e.g., the connector module 300 of FIG. 1) to at least partially be inserted, and the connecting terminals may be provided to correspond in number and shape to the connecting terminals of the connector module 300. The connector structure 250 of the second electronic device 200 may electrically connect to the connecting terminals of the connector module 300 which protrude from a first electronic device (e.g., the electronic device 100 of FIG. 1).

According to an embodiment of the disclosure, a magnet (not shown) may be mounted inside or around the connector structure 250 of the second electronic device 200 to magnetically couple with a magnet or metal piece disposed on the edge surface of the first electronic device 100. The magnetic coupling enables a firm fastening between the first electronic device 100 and the second electronic device 200.

According to an embodiment of the disclosure, although one connector structure 250 is formed on the edge of the lower end portion 211 of the second electronic device 200, embodiments of the disclosure are not limited, and it may rather be formed on an upper end portion 212 and/or side area or a plurality of connector structures 250 may be formed on the lower end portion 211. Accordingly, the second electronic device 200 coupled via the connector module 300 of the first electronic device 100 may be allowed various positions, e.g., side-by-side or top-to-down.

Figure 3:
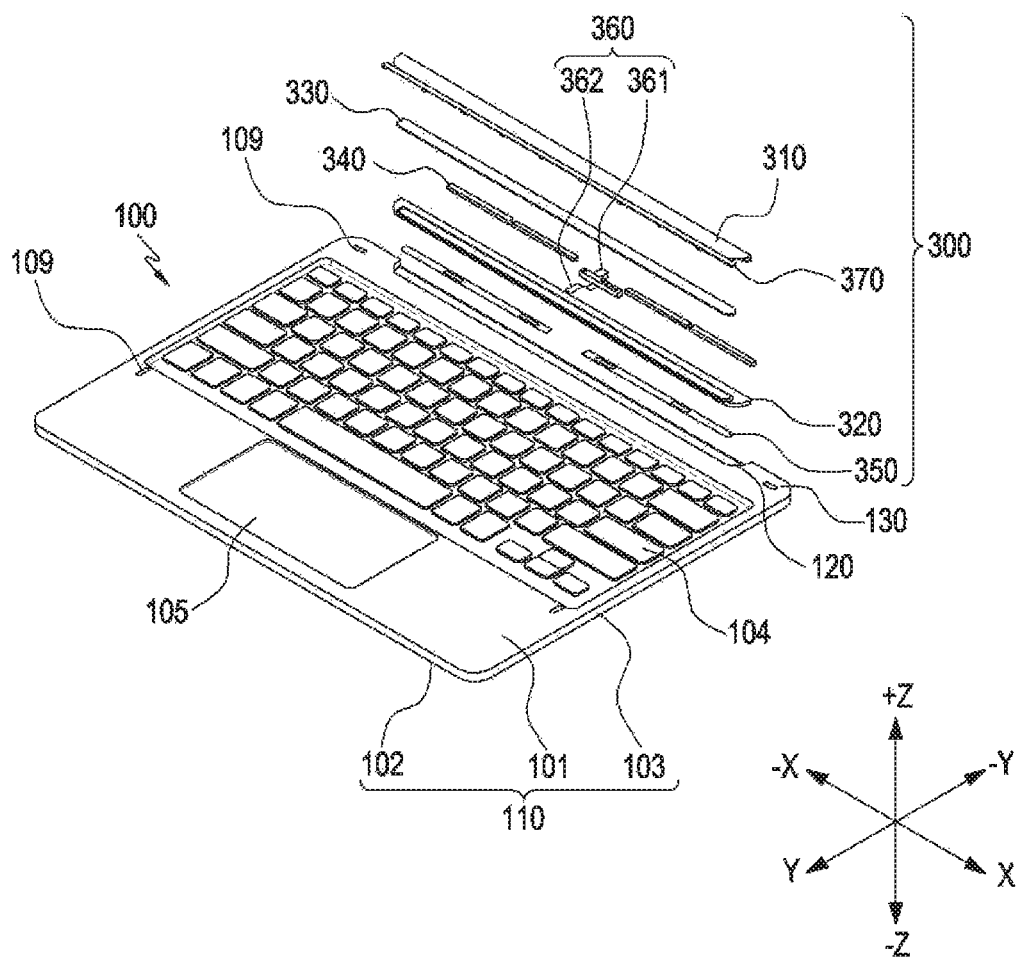
FIG. 3 is an exploded perspective view illustrating parts of a connector module 300 in a portable electronic device 10 according to an embodiment of the disclosure.
Figure 4A:
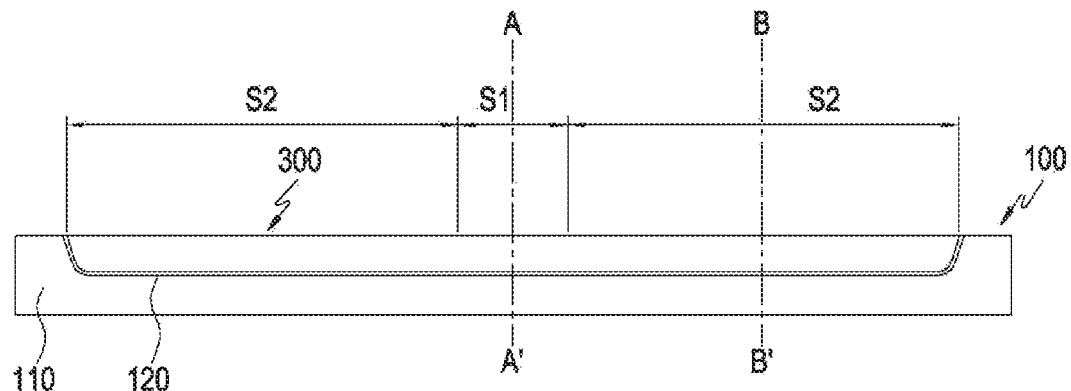
FIG. 4A is a cross-sectional view illustrating a side surface of a connector module 300 seated in a stored state inside a recess 120 in a first electronic device 100 according to an embodiment of the disclosure.
Figure 4B:
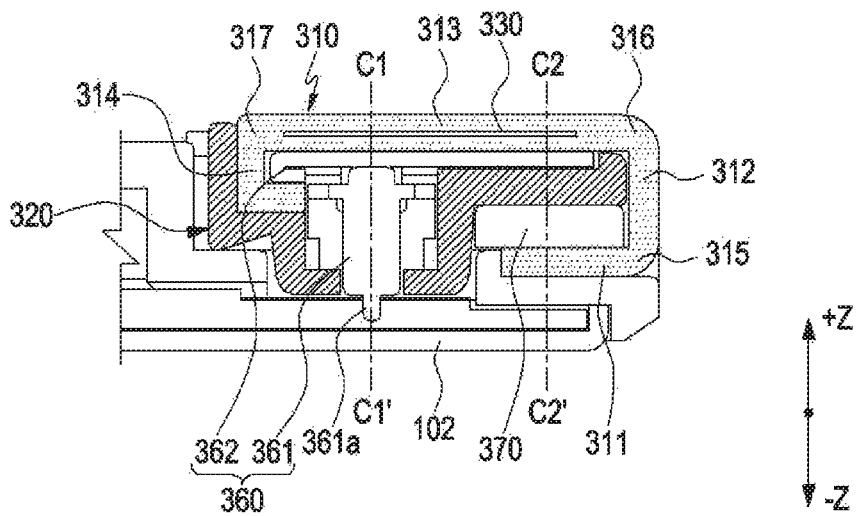
FIG. 4B is a cross-sectional view taken along line A-A' crossing a first area Si of FIG. 4A according to an embodiment of the disclosure.
Figure 4C:
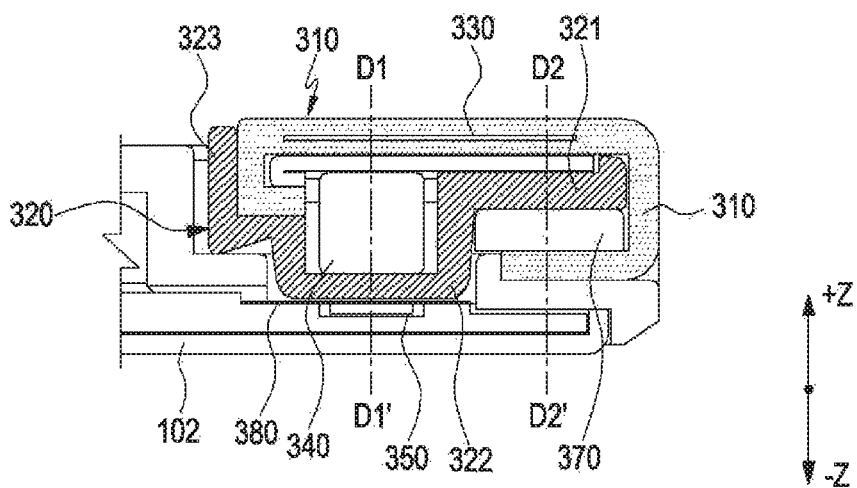
FIG. 4C is a cross-sectional view taken along line B-B' crossing a second area of FIG. 4A according to an embodiment of the disclosure.

FIG. 3 is an exploded perspective view illustrating parts of a connector module 300 in a portable electronic device 10 according to an embodiment of the disclosure. FIG. 4A is a cross-sectional view illustrating a side surface of a connector module 300 seated in a stored state inside a recess 120 in a first electronic device 100. FIG. 4B is a cross-sectional view taken along line A-A' crossing a first area S1 of FIG. 4A. FIG. FIG. 4C is a cross-sectional view taken along line B-B' crossing a second area of FIG. 4A. The structure of the first electronic device 100 shown in FIGS. 3, 4A, B, and 4C may be the whole or part of the structure of the first electronic device 100 of FIG. 1.

Referring to FIG. 3, the portable electronic device may include the first electronic device 100 with a recess 120 shaped as a hole and a connector module 300 disposed inside the recess 120.

In the three-axis rectangular coordinate system as shown in FIG. 3, 'X,' 'Y,' and 'Z,' respectively, may denote the length, width, and height directions of the first electronic device 100. According to an embodiment of the disclosure, '+Z' may mean a first direction, '−Z' a second direction, '+Y' a third direction, '+X' or '−X' a fourth direction, and '−Y' a fifth direction.

According to an embodiment of the disclosure, the first electronic device 100 may include a housing 110 that has a first surface 101 facing in the first direction +Z, a second surface 102 facing in the second direction −Z which is opposite to the first direction +Z, and a side surface 103 surrounding a space between the first surface 101 and the second surface 102. According to an embodiment of the disclosure, the first electronic device 100 may include a recess 120 that is open in at least one direction and formed in an upper end portion 130 of the first surface 101 to have the connector module 300 placed therein. According to an embodiment of the disclosure, the one side-opened recess 120 may be formed on the edge surface of the upper end portion 130 of the first electronic device 100 along the lengthwise direction (fourth direction +X or −X) of the first electronic device 100.

According to an embodiment of the disclosure, the recess 120 may be implemented to be open at least one side thereof. For example, a surface facing in the third direction +Y which is perpendicular to the first direction +Z with respect to the center of the recess 120 and another surface facing the fourth direction +X or −X which is perpendicular to the first direction +Z may form stepped surfaces in the housing 110. As another example, an opening may be configured in the fifth direction −Y which is opposite to the third direction +Y and in the first direction +Z with respect to the center of the opened recess 120, and the connector module 300 may be unfolded along the direction of the opening.

According to an embodiment of the disclosure, the connector module 300 may be placed inside the one side-opened recess 120. The connector module 300 may include unfoldable parts 310 and 320 that may be received inside the housing 110 or unfolded outside, a connector part 360 that couples to the second electronic device (e.g., the second electronic device 200 of FIGS. 1 and 2), and at least one metal piece 330 and 350 and magnet 340 inducing a magnetic mutual action (e.g., magnetic attraction).

According to an embodiment of the disclosure, the connector module 300 may include a first area Si that is a central portion where the connector part 360 is placed with respect to the lengthwise direction (fourth direction +X or −X) and a second area S2, which is the rest of the central portion, at both sides of the connector part 360 where a plurality of magnets 340 are placed.

Figure 10:
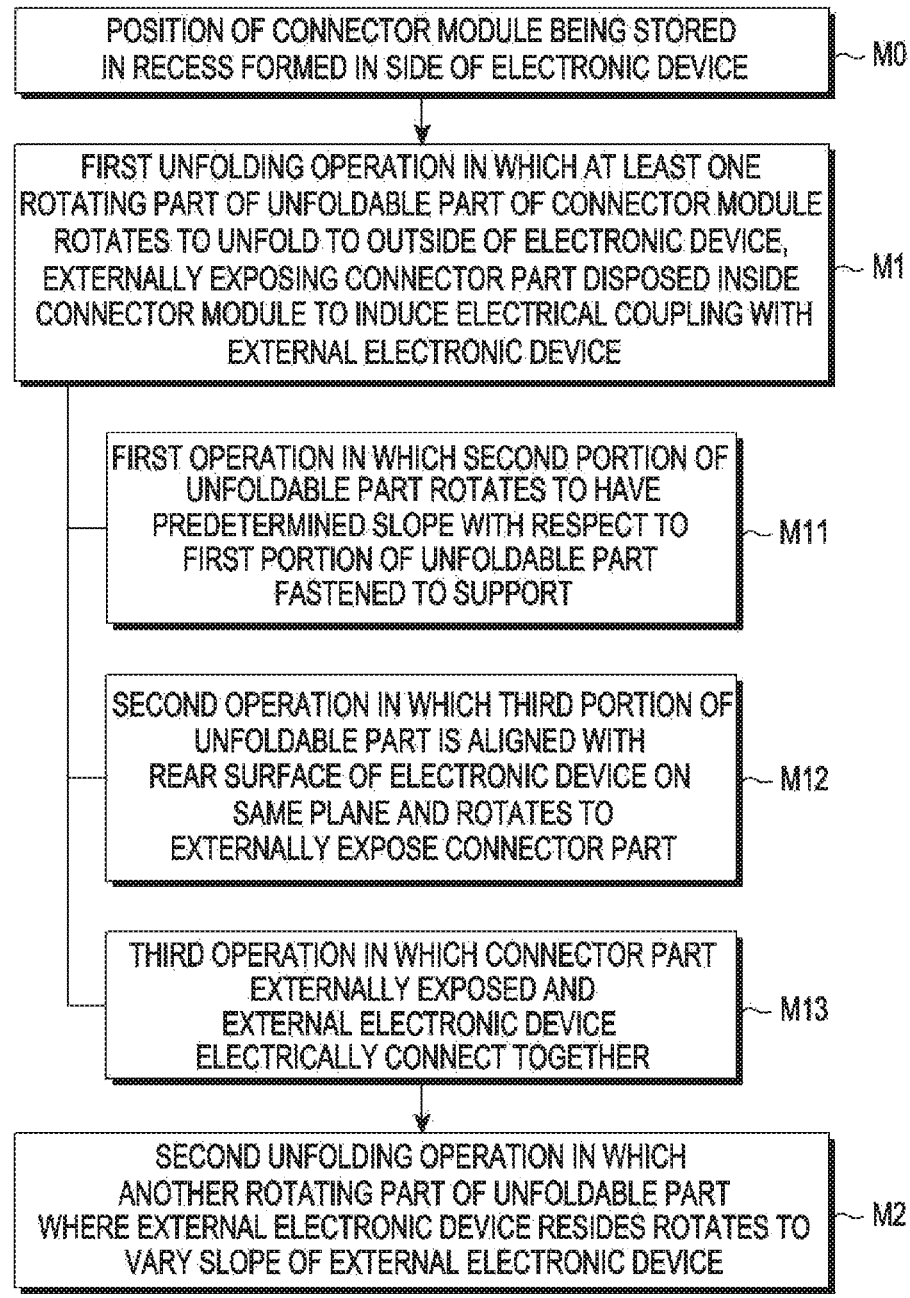
FIG. 10 is a flowchart illustrating an expanding operation of a connector module of an electronic device according to an embodiment of the disclosure.

According to an embodiment of the disclosure, the unfoldable parts 310 and 320 may come in a stored position M0 where they are stored inside the recess 120, a first unfolding operation M1 where the unfoldable parts 310 and 320 first unfold to the outside of the recess 120, and a second unfolding operation M2 where, after the first unfolding operation M1, the unfoldable parts 310 and 320 additionally (second) unfold. Now described in detail is the stored position M0 (refer to the stored position M0 of FIG. 10).

In the stored position M0, the unfoldable parts 310 and 320 of the connector module 300 may be positioned inside the recess 120 while being at least partially exposed. For example, the surfaces of the unfoldable parts 310 and 320 facing in the first direction +Z and/or the surfaces facing in the fifth direction −Y may be exposed to the outside of the housing 110.

According to an embodiment of the disclosure, in an internal space surrounded by the unfoldable parts 310 and 320 may be mounted parts, such as at least one metal piece 330 and 350, the magnet 340, and/or the connector part 360, and a plurality of flexible plates may be configured to surround the various parts. For example, the unfoldable parts 310 and 320 may form an outside surface of the connector module 300 in a bent or curved shape.

According to an embodiment of the disclosure, the unfoldable parts 310 and 320 may include a first unfoldable part 310 forming at least a portion of the outside surface of the connector module 300 and a second unfoldable part 320 extending from the first unfoldable part 310 and forming a remaining portion of the outside surface of the connector module 300. The first unfoldable part 310 may include a rotatable portion upon switching to the first unfolding operation M1, and the second unfoldable part 320 may include a rotatable portion upon switching to the second unfolding operation M2.

According to an embodiment of the disclosure, the first unfoldable part 310 may configure a majority of the surface facing in the first direction +Z of the outside surface of the connector module 300 and/or the surface facing in the fifth direction −Y, thereby being exposed to the outside of the housing 110. Inside the first unfoldable part 310 may be disposed a first metal piece 330 that may remain magnetically coupled with the magnet 340 described below. The second unfoldable part 320 may extend from the first unfoldable part 310 and contact the inside of the recess 120 of the housing 110 without exposure to the outside. However, the second unfoldable part 320 may remain externally exposed in the first unfolding operation M1 or second unfolding operation M2.

FIG. 4A is a cross-sectional view illustrating a side surface of a connector module 300 seated in a stored state inside a recess 120 in a first electronic device 100. FIG. 4B is a cross-sectional view taken along line A-A' crossing a first area S1 of FIG. 4A. FIG. 4C is a cross-sectional view taken along line B-B' crossing a second area of FIG. 4A.

According to an embodiment of the disclosure, the connector part 360 and the magnet 340 may be disposed in some inside space surrounded by the first unfoldable part 310 and the second unfoldable part 320.

Referring to FIG. 4B, the connector part 360 may be disposed in a central part of the connector module 300 with respect to the first area S1. The connector part 360 may include a contact part 361 and a printed circuit board 362. For example, the connector part 360 may include the contact part 361 with a plurality of contacts 361a for electrical connection with the second electronic device (the second electronic device 200 of FIGS. 1 and 2). The second unfoldable part 320 may have an opening in the position facing the contacts 361a to allow the contacts 361a to face in the second direction −Z in the stored position M0. As another example, at least one hole may be formed in the inside of the second surface 102 of the housing 110 to allow the contacts 361a to pass through the opening of the second unfoldable part 320 to be inserted therein without damage. As still another example, the printed circuit board 362 may be a flexible printed circuit board electrically connectable to the first electronic device 100.

According to an embodiment of the disclosure, the connector module 300 disposed on the same line C1-C1' as the center of the connector part 360 of the first area Si may have the first unfoldable part 310 with the first metal piece 330 disposed therein, connector part 360, and second unfoldable part 320 stacked on the second surface 102 of the housing 110 from the top towards the second direction −Z. As another example, the coupling structure disposed on the same line C2-C2' as the center of a support 370 may have a side of the first unfoldable part 310 with the first metal piece 330 disposed therein, the second unfoldable part 320, and the other side of the first unfoldable part 310 stacked on the second surface 102 of the housing 110 from the top towards the second direction −Z.

According to an embodiment of the disclosure, the support 370 may be disposed between the first unfoldable part 310 and the second unfoldable part 320 to fasten a side of the first unfoldable part 310 to the inside of the housing 110 while calibrating the height of the second unfoldable part 320. For example, the support 370 may be sized corresponding to the lengthwise direction of the first unfoldable part 310 or second unfoldable part 320. The second unfoldable part 320 may be disposed in contact on the top of the support 370, and the first unfoldable part 310 may be disposed in contact on the bottom. The first unfoldable part 310 may be structured for a first unfolding so that a first portion 311 of the first unfoldable part 310 is located fixed to the housing 110 while the rest of the first unfoldable part 310 unfolds. The first portion 311 may be fastened to the inside of the housing 110 through the support 370.

Referring to FIG. 4C, magnets 340 may be disposed at both sides of the center of the recess 120 with respect to the second areas S2, and the magnets 340 may be shaped as bars in the lengthwise direction corresponding to the first unfoldable part 310. For example, the magnets 340 may maintain electrical couplings with the metal pieces arranged inside the housing 110 to keep the first unfoldable part 310 and/or second unfoldable part 320 in the folded position in the stored position MO. Magnetic couplings between the magnets 340 and separate metal pieces on the top and bottom may leave the connector module 300 to be stored in an efficient way.

According to an embodiment of the disclosure, the connector module 300 disposed on the same line D1-D1' as the centers of the magnets 340 in the second areas S1 may have the first unfoldable part 310 with the first metal piece 330 disposed therein, magnets 340, second unfoldable part 320, and second metal piece 350 stacked on the second surface 102 of the housing 110 from the top towards the second direction −Z. As another example, the connector module 300 disposed on the same line D2-D2' as the center of the support 370 in the second areas S2 may have one side of the first unfoldable part 310 with the first metal piece 330 disposed inside, the second unfoldable part 320, the support 370, and the other side of the first unfoldable part 310 stacked on the second surface 102 of the housing 110 from the top towards the second direction −Z. The support 370 may be disposed between the first unfoldable part 310 and the second unfoldable part 320 to fasten a side of the first unfoldable part 310 to the inside of the housing 110 while calibrating the height of the second unfoldable part 320.

According to an embodiment of the disclosure, the magnet 340 may be disposed fixed in an internal space surrounded by the first unfoldable part 310 and the second unfoldable part 320, and a plurality of magnets 340 may be provided in the plurality of second areas S2. When viewed from above the connector module 300, the magnets 340 may be disposed to face each other with the connector part 360 therebetween. Each magnet 340 may induce a coupling by magnetic attraction with a metal piece placed in the corresponding area S2.

According to an embodiment of the disclosure, the connector module 300 may include the first metal piece 330 on the top of the magnets 340 and second metal pieces 350 on the bottom of the magnets 340. The first metal piece 330 and the second metal pieces 350 may be disposed to face each other with the magnets 340 therebetween.

According to an embodiment of the disclosure, the first metal piece 330 may be disposed inside a third portion 313 of the first unfoldable part 310 in the shape of an elongated bar corresponding to the lengthwise direction of the first unfoldable part 310. The first metal piece 330 may be separated from the magnets 340 in the second unfolding operation M2 of the connector module 300 which is described below.

According to an embodiment of the disclosure, the second metal pieces 350 may fixedly rest on the bottom surface of the recess 120 of the housing 110 and may be shaped as elongated bars corresponding to the lengthwise direction of the recess 120. The second metal pieces 350 may be separated from the magnets 340 in the first unfolding operation M1 of the connector module 300 which is described below. The second metal pieces 350 may be protected by a cover 380 formed of, e.g., plastic or fabric, not to be exposed to the outside even after the second unfolding operation M2.

According to an embodiment of the disclosure, the first unfoldable part 310 may be a plate with a plurality of rotating parts 315, 316, and 317. The first unfoldable part 310 may be formed of a material such as plastic or fabric and may be disposed between the magnets 340 and the metal pieces 330 and 350 to allow the user easy attaching and removal.

In the stored position M0, the first unfoldable part 310 may constitute the connector module 300 while being at least partially exposed to the outside and may include a first portion 311 fastened to the support 370, a second portion 312 extending from the first portion 311 and exposed to the outside, a third portion 313, and a fourth portion 314 extending from the third portion 313 and coupled with the second unfoldable part 320. A first rotating part 315 rotatable at 180 degrees or more may be included between the first portion 311 and the second portion 312, and a second rotating part 316 rotatable at 180 degrees or more may be included between the second portion 312 and the third portion 313. A third rotating part 317 rotatable at 90 degrees or more may be included between the third portion 313 and the fourth portion 314.

For example, the first rotating part 315 and the second rotating part 316 may rotate to unfold the second portion 312 and third portion 313 of the first unfoldable part 310 in the first unfolding operation M1, and the third rotating part 316 may rotate to unfold the fourth portion 314 of the first unfoldable part 310 in the second unfolding operation M2.

According to an embodiment of the disclosure, the second unfoldable part 320 may be a plate with multiple bends and/or curves. The second unfoldable part 320 may be formed of a material such as plastic or fabric and may be disposed between the magnets 340 and the metal pieces 330 and 350 to allow the user easy attaching and removal.

In the stored position M0, the second unfoldable part 320 may constitute the connector module 300 while being placed inside the recess 120 not to be exposed and may include a first portion 321 fastened to the fourth portion 314 of the first unfoldable part 310, a second portion 322 extending from the first portion 321 and receiving the magnet 340 and/or at least part of the connector module 300, and a third portion 323 extending from the second portion 322 and disposed opposite the support 370. The second unfoldable part 320 may be removed from the recess 120 and exposed to the outside in the first unfolding operation M1 as the first unfoldable part 310 rotates.

According to an embodiment of the disclosure, since the connector module 300 is inserted and placed in an inner space of the recess 120 of the first electronic device 100, as the first electronic device 100 is viewed from above the front and/or side surface, the connector module 300 may be implemented seamlessly from each area of the housing 110, thereby achieving a simplified structure. This allows the electronic device a tidy and seamless look overall, and such aesthetic aspect remains even upon carrying the electronic device by avoiding the connector module 300 from sticking out.

Now described in detail is the first unfolding operation M1 of the connector module 300.

Figure 5A:
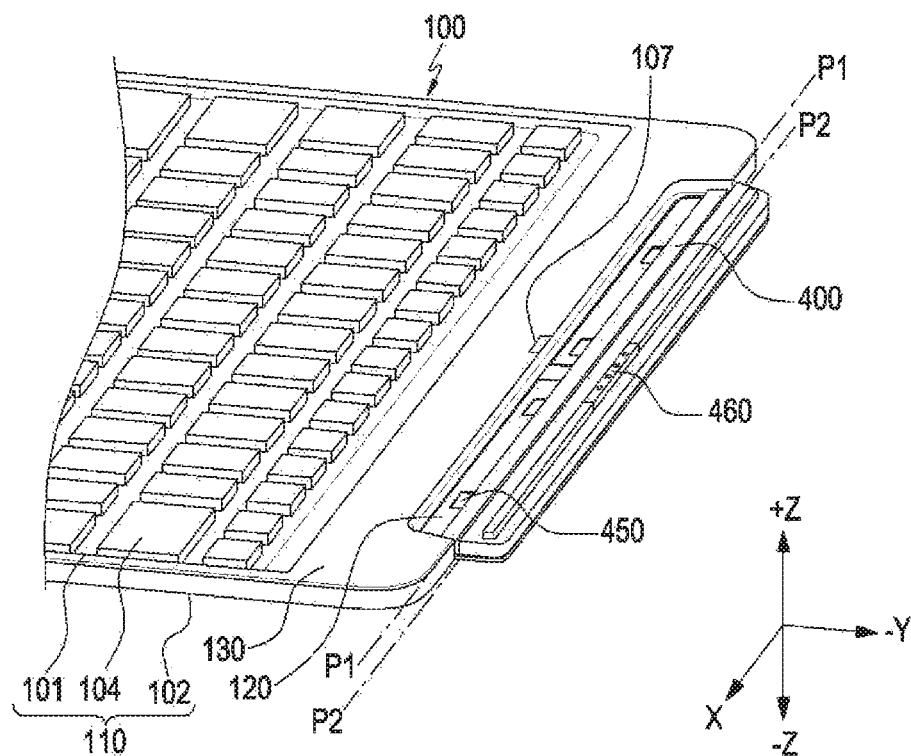
FIGS. 5A and 5B are a perspective view illustrating a first expanding operation M1 of a connector module 400 of a first electronic device 100 according to various embodiments of the disclosure.
Figure 5B:
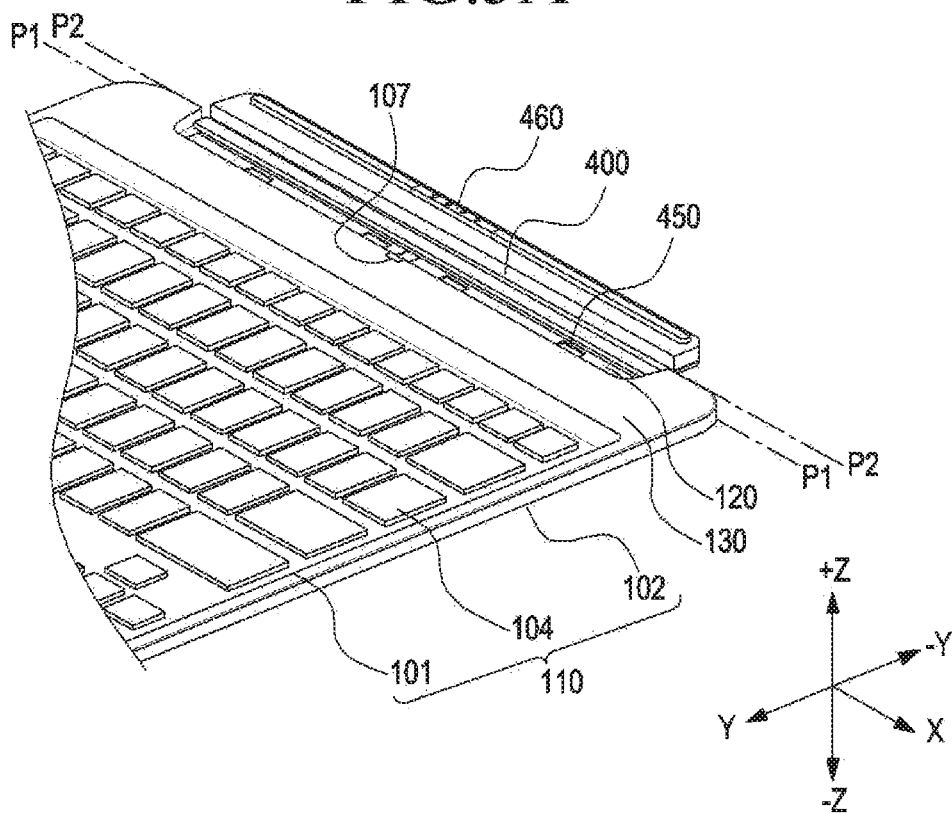
Figure 6A:
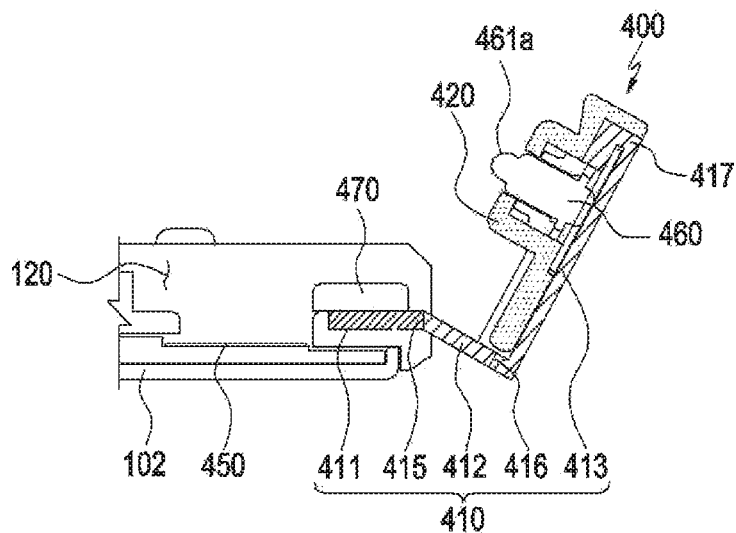
FIGS. 6A, 6B and 6C are cross-sectional views illustrating a first area (the first area S1 of FIG. 4A) in a first expanding operation M1 of a connector module 400 of a first electronic device 100 according to various embodiments of the disclosure.
Figure 6B:
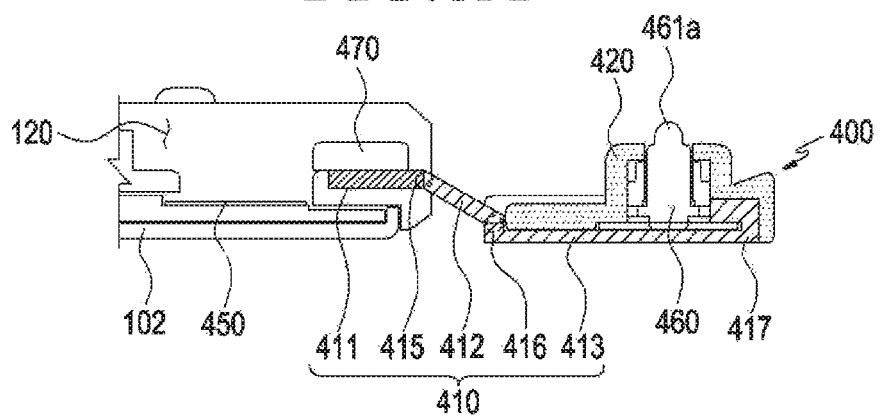
Figure 6C:
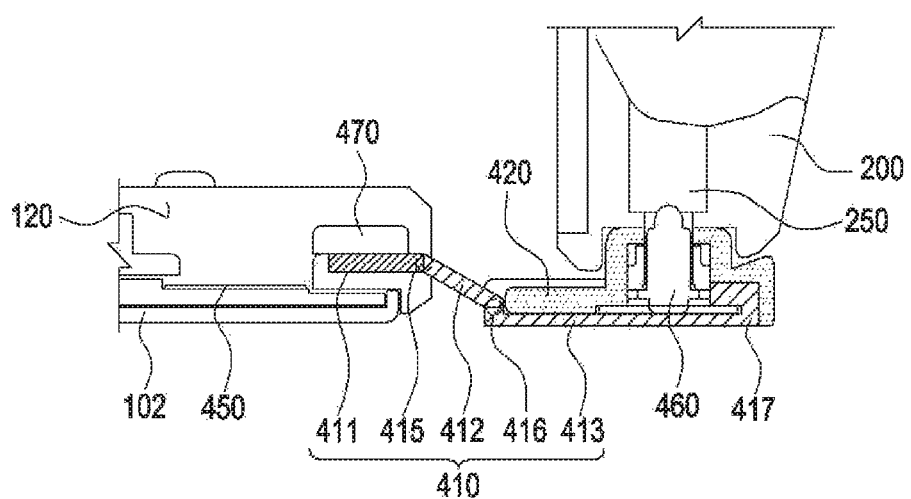

FIGS. 5A and 5B are a perspective view illustrating a first expanding operation M1 of a connector module 400 of a first electronic device 100 according to an embodiment of the disclosure. FIGS. 6A, 6B and 6C are cross-sectional views illustrating a first area (the first area 51 of FIG. 4A) in a first expanding operation M1 of a connector module 400 of a first electronic device 100 according to an embodiment of the disclosure. The first electronic device 100 and the connector module 400 of FIGS. 5A, 5B and 6A, 6B, 6C may be the whole or part of the first electronic device 100 and connector module 300 of FIGS. 3, 4A, 4B and 4C.

In the three-axis rectangular coordinate system as shown in FIGS. 5A, 5B, 6A, 6B and 6C, 'X,' 'Y,' and 'Z,' respectively, may denote the length, width, and height directions of the first electronic device 100. According to an embodiment of the disclosure, '+Z' may mean a first direction, '−Z' a second direction, '+Y' a third direction, '+X' or '−X' a fourth direction, and '−Y' a fifth direction.

Referring to FIGS. 5A and 6A, the electronic device may include a first electronic device 100 with a recess 120 shaped as a hole opened at one side and a connector module 400 disposed inside the recess 120. For example, the first electronic device 100 may include a housing 110 that has a first surface 101 facing in the first direction +Z, a second surface 102 facing in the second direction −Z which is opposite to the first direction +Z, and a side surface 103 surrounding a space between the first surface 101 and the second surface 102. The connector module 400 may be disposed on a front-end area of the first surface 101 of the housing 110. The connector module 400 may sequentially unfold to expose the connector part 460 for an electrical coupling with an external device (e.g., the second electronic device 200 of FIG. 1).

According to an embodiment of the disclosure, the connector module 400 may include unfoldable parts 410 and 420 that may be received inside the housing 110 or unfolded outside, a connector part 460 that couples to the second electronic device (e.g., the second electronic device 200 of FIGS. 1 and 2), and at least one metal piece 430 and 450 and magnet 440 inducing a magnetic mutual action.

According to an embodiment of the disclosure, the first unfoldable part 410 may be a plate with a plurality of rotating parts 415, 416, and 417. The first unfoldable part 410 may be formed of a material such as plastic or fabric and may be disposed between the magnets 440 and the metal pieces 430 and 450 to allow the user easy attaching and removal.

For example, the first unfoldable part 410 may constitute the connector module 400 while being at least partially exposed to the outside and may include a first portion 411 fastened to the support 470, a second portion 412 extending from the first portion 411 and exposed to the outside, a third portion 413, and a fourth portion 414 extending from the third portion 413 and coupled with the second unfoldable part 420. A first rotating part 415 rotatable at 180 degrees or more may be included between the first portion 411 and the second portion 412, and a second rotating part 416 rotatable at 180 degrees or more may be included between the second portion 412 and the third portion 413. A third rotating part 417 rotatable at 90 degrees or more may be included between the third portion 413 and the fourth portion 414. As another example, the second unfoldable part 420 may constitute the connector module 400 while unfolding from the inside of the recess 120 to be at least partially exposed and may include a first portion 421 fastened to the fourth portion 414 of the first unfoldable part 410, a second portion 422 extending from the first portion 421 and receiving the magnet 440 and/or at least part of the connector module 400, and a third portion 423 extending from the second portion 422 and disposed opposite the support 470.

According to an embodiment of the disclosure, in the first unfolding operation M1, the first rotating part 415 of the first unfoldable part 410 of the connector module 400 may form a first virtual axis P1, and the first unfoldable part 410 may rotate around the first virtual axis P1. Further, the second rotating part 416 of the first unfoldable part 410 may form a second virtual axis P2, and the first unfoldable part 410 may rotate around the second virtual axis P2.

According to an embodiment of the disclosure, as some portions (e.g., the second portion 412 and third portion 413) of the first unfoldable part 410 rotate around different axes (e.g., the first virtual axis A1 and the second virtual axis A2), it may be unfolded to the outside of the first electronic device 100. The second portion 412 or third portion 413 of the first unfoldable part 410 may rotate about the first portion 411 in a range from 0 degrees to 270 degrees. For ease of description, the angle ranging from 0 degrees to 270 degrees may be defined as the angle of the second portion 412 about the first portion 411 and/or the angle of the third portion 413 about the second portion 412.

According to an embodiment of the disclosure, the first unfolding operation M1 (refer to the first unfolding operation M1 of FIG. 10) may be defined as a first operation (M11 of FIG. 6A) in which the angle of the second portion 412 about the first portion 411 is more than 90 degrees and less than 270 degrees and a second operation (M12 of FIG. 6B) in which the angle of the third portion 413 about the second portion 412 is more than 90 degrees and less than 180 degrees. The first operation M11 and the second operation M12 may be performed sequentially or simultaneously. After the first operation M11 and the second operation M12 are complete, a third operation (M13 of FIG. 6C) may be performed in which an external electronic device (e.g., the second electronic device 200 of FIG. 1) and the connector part 460 exposed to the outside are electrically coupled together.

According to an embodiment of the disclosure, in the first operation M11, the first portion 411 and second portion 412 of the first unfoldable part 410 may be arranged to have a predetermined angle (e.g., an angle more than 90 degrees and less than 270 degrees). The second unfoldable part 420 fastened to the first unfoldable part 410 and the connector part 460 and magnets (e.g., the magnets 440 of FIG. 4) disposed in the inner space may be moved corresponding to the rotation of the first unfoldable part 410. For example, the second unfoldable part 420 may be sequentially exposed more and more as per rotation, and when the first operation M11 is complete, it may be exposed in whole to the outside. As another example, as rotating, the magnetic force between the magnets (e.g., the magnets 440 of FIG. 4) and the second metal pieces 450 may weaken. Therefore, as the first operation M11 proceeds, the second metal pieces 450 may be positioned away in the area where the magnetic force of the magnets (e.g., the magnets 440 of FIG. 4) does not reach. For the user to easily leave the first unfoldable part 410 away from the recess 120 in the first operation M11, a hole 107 may be formed in the area of the first surface 101 of the housing 110 which abuts the recess 120. The user may simply turn the first rotating part 415 of the first unfoldable part 410 around the first virtual axis P1 by inserting his finger into the hole 107 and then pushing the first unfoldable part 410 in the fifth direction −Y.

According to an embodiment of the disclosure, in the second operation M12, the second portion 412 and third portion 413 of the first unfoldable part 410 may be arranged to have a predetermined angle (e.g., an angle more than 90 degrees and less than 180 degrees). The second unfoldable part 420 fastened to the first unfoldable part 410 and the connector part 460 and magnets (e.g., the magnets 440 of FIG. 4) disposed in the inner space may be moved corresponding to the rotation of the first unfoldable part 410. For example, in the connector part 460 of the second unfoldable part 420, the plurality of contacts 461a may move in the first direction +Z as rotating. This may set up an arrangement for an advantageous coupling with an external electronic device (e.g., the second electronic device 200 of FIG. 1). The second operation M12 may be performed with the overall first unfoldable part 410 of the connector module 400 externally exposed by the first operation M11.

According to an embodiment of the disclosure, when the second operation M12 is complete, the third portion 413 of the first unfoldable part 410 may be aligned on the same plane (e.g., its underneath surface) with the second surface 102 of the first electronic device 100. The first portion 411 of the first unfoldable part 410 may be fastened in the first electronic device 100, aiding the third portion 413 in stably remaining away from the first electronic device 100 at a predetermined distance. The third portion 413 may be positioned in parallel with the first portion 411. The second portion 412 of the first unfoldable part 410 may connect the first portion 411 with the third portion 413 and maintain a predetermined angle with respect to the first portion 411 and third portion 413, helping the third portion 413 to tightly and stably contact its underneath surface without floating. Accordingly, the contacts 461a of the connector part 460 arranged in the direction perpendicular to the third portion 413 may stably be oriented in the first direction +Z.

According to an embodiment of the disclosure, in the third operation M13, an electrical connection may be made between the connector part 460 of the connector module 400 and an external electronic device 200 (e.g., the second electronic device 200 of FIG. 1). For example, as the contacts 461a of the connector part 460 interconnect with the contacts of the connector structure (or part) 250 disposed at a side of the electronic device 200, electrical signals from the first electronic device 100 may be transmitted to the external electronic device 200. As another example, magnets and metal pieces (not shown) may be disposed around the contacts 461a of the connector part 460 and around the connector structure 250 of the external electronic device 200, enabling strong physical connection between the two electronic devices. As still another example, in the connector structure, at least one metal piece may be disposed in an area of the external electronic device 200 which is positioned opposite the second areas S2 where the magnets 440 are disposed, maintaining a firm physical connection between the two electronic devices.

The second unfolding operation M2 of the connector module 400 is described below.

Figure 7A:
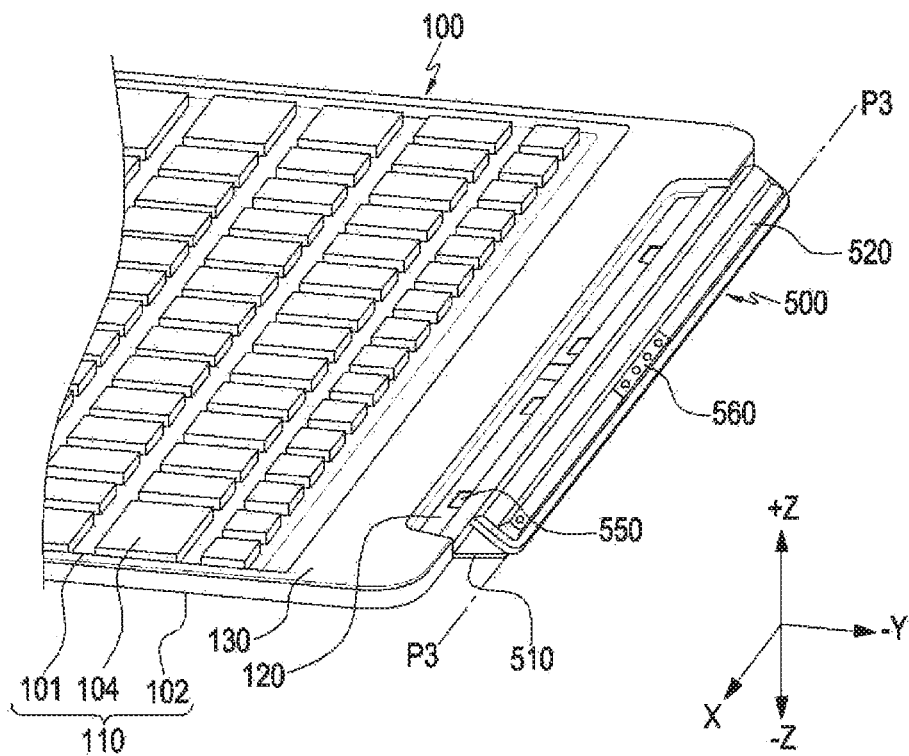
FIGS. 7A and 7B are a perspective view illustrating a second expanding operation M2 of a connector module 500 of a first electronic device 100 according to various embodiments of the disclosure.
Figure 7B:
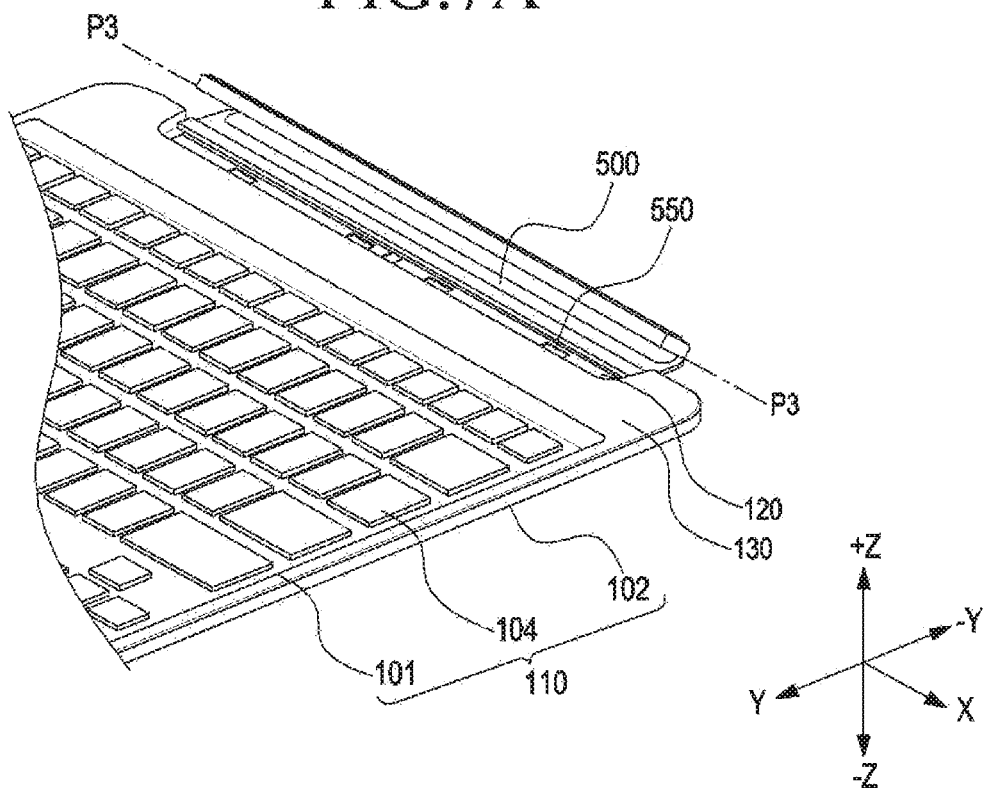
Figure 8:
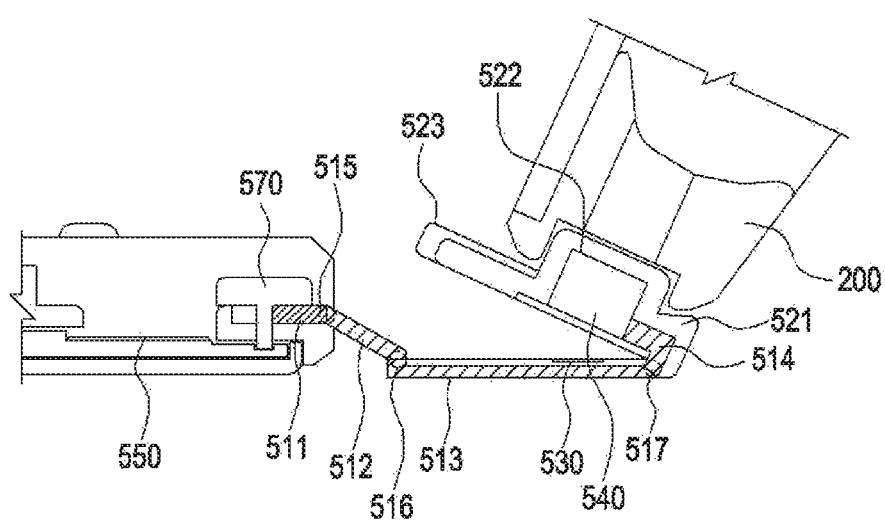
FIG. 8 is a cross-sectional view illustrating a second area (the second area S2 of FIG. 4A) in a second expanding operation M2 of a connector module 500 of a first electronic device 100 according to an embodiment of the disclosure.

FIGS. 7A and 7B are a perspective view illustrating a second expanding operation M2 of a connector module 500 of a first electronic device 100 according to an embodiment of the disclosure. FIG. 8 is a cross-sectional view illustrating a second area (the second area S2 of FIG. 4A) in a second expanding operation M2 of a connector module 500 of a first electronic device 100 according to an embodiment of the disclosure. The first electronic device 100 and the connector module 500 of FIGS. 7A, 7B and 8 may be the whole or part of the first electronic device 100 and connector module 300 of FIGS. 3, 4A, 4B, and 4C.

In the three-axis rectangular coordinate system as shown in FIGS. 7A and 8, 'X,' 'Y,' and 'Z,' respectively, may denote the length, width, and height directions of the first electronic device 100. According to an embodiment of the disclosure, '+Z' may mean a first direction, '−Z' a second direction, '+Y' a third direction, '+X' or '−X' a fourth direction, and '−Y' a fifth direction.

Referring to FIGS. 7A, 7B, and 8, the electronic device may include a first electronic device 100 with a recess 120 shaped as a hole opened at one side and a connector module 500 disposed inside the recess 120. For example, the first electronic device 100 may include a housing 110 that has a first surface 101 facing in the first direction +Z, a second surface 102 facing in the second direction −Z which is opposite to the first direction +Z, and a side surface 103 surrounding a space between the first surface 101 and the second surface 102. The connector module 500 may be disposed on a front-end area of the first surface 101 of the housing 110. The connector module 500 may set various angles for the user to view the display part of an external device (e.g., the second electronic device 200 of FIG. 1) in a convenient manner while in electrical connection with the external device.

According to an embodiment of the disclosure, the connector module 500 may include unfoldable parts 510 and 520 that may be received inside the housing 110 or unfolded outside, a connector part 560 that couples to the second electronic device (e.g., the second electronic device 200 of FIGS. 1 and 2), and at least one metal piece 530 and 550 and magnet 540 inducing a magnetic mutual action.

According to an embodiment of the disclosure, the first unfoldable part 510 may be a plate with a plurality of rotating parts 515, 516, and 517. The first unfoldable part 510 may be formed of a material such as plastic or fabric and may be disposed between the magnets 540 and the metal pieces 530 and 550 to allow the user easy attaching and removal.

For example, the first unfoldable part 510 may constitute the connector module 500 while being at least partially supported against its underneath surface and may include a first portion 511 fastened to the support 570, a second portion 512 extending from the first portion 511 and exposed to the outside, a third portion 513, and a fourth portion 514 extending from the third portion 513 and coupled with the second unfoldable part 520. A first rotating part 515 rotatable at 180 degrees or more may be included between the first portion 511 and the second portion 512, and a second rotating part 516 rotatable at 180 degrees or more may be included between the second portion 512 and the third portion 513. A third rotating part 517 rotatable at 90 degrees or more may be included between the third portion 513 and the fourth portion 514. As another example, the second unfoldable part 520 may constitute the connector module 500 while unfolding from the inside of the recess 120 to be at least partially exposed and may include a first portion 521 fastened to the fourth portion 514 of the first unfoldable part 510, a second portion 522 extending from the first portion 521 and receiving the magnet 540 and/or at least part of the connector module 500, and a third portion 523 extending from the second portion 522 and disposed opposite the support 570.

According to an embodiment of the disclosure, the third rotating part 517 of the first unfoldable part 510 of the connector module 500 may form a third virtual axis P3, and the fourth portion 514 of the first unfoldable part 510 may rotate around the third virtual axis P3.

According to an embodiment of the disclosure, as a portion (e.g., the fourth portion 514) of the first unfoldable part 510 rotates around the third virtual axis P3, the external electronic device 200 coupled with the connector module 500 may be moved to allow the user to view from various angles. The fourth portion 514 of the first unfoldable part 510 may rotate about the third portion 513 in a range from 0 degrees to 90 degrees. For ease of description, the angle from 0 degrees to 90 degrees may be the angle of the fourth portion 514 with respect to the third portion 513.

For example, the second unfolding operation M2 (refer to the second unfolding operation M2 of FIG. 10) is defined as an operation in which the angle of the fourth portion 514 about the third portion 513 is more than 0 degrees and less than 90 degrees (FIG. 8). Although the second unfolding operation M2 may sequentially be performed after the first unfolding operation (the first operation M11 to the third operation M13), embodiments of the disclosure are not limited thereto, and the second unfolding operation M2 may be performed simultaneously with the first unfolding operation M1.

According to an embodiment of the disclosure, the second unfoldable part 520 fastened to the first unfoldable part 510 and the connector part and magnets 540 disposed in the inner space may be moved corresponding to the rotation of the first unfoldable part 510.

According to an embodiment of the disclosure, in the second unfolding operation M2, the first metal piece 530 disposed in the third portion 513 may be separated from the magnet 540 disposed in the second unfoldable part 520. For example, before the second unfolding operation M2, the first metal piece 530 and the magnet 540 remain coupled together by their mutual magnetic force while positioned opposite each other. Thereafter, by the user's action, the magnet 540 may be turned and its magnetic coupling force with the first metal piece 530 may be reduced. As the second unfolding operation M2 proceeds, the first metal piece 530 may be positioned away in an area where the magnetic force from the magnet 540 does not reach. In the second unfolding operation M2, the user may push the second unfoldable part 520 with his finger to easily leave a portion of the second unfoldable part 520 a predetermined distance away from the first unfoldable part 510. The user may simply turn the third rotating part 517 of the first unfoldable part 510 around the third virtual axis P3 by pushing the second unfoldable part 520 in the fifth direction −Y or the external electronic device in the fifth direction −Y. The user may freely adjust the angle of the external device 200 in a range from 90 degrees to 180 degrees about the first electronic device 100 so that the display unit, e.g., monitor, of the second electronic device 200 comes to a position where comfortable viewing is possible.

Figure 9:
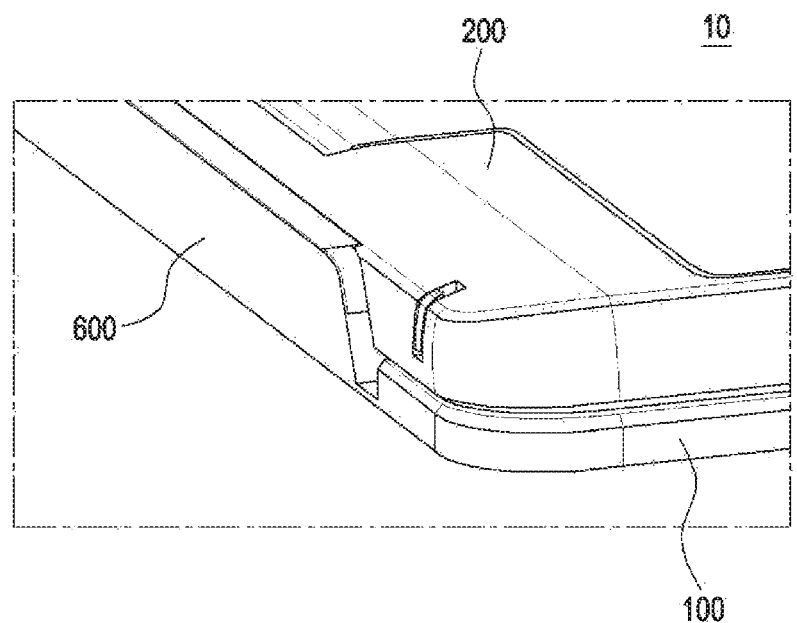
FIG. 9 is a perspective view illustrating a state in which a first electronic device 100 and a second electronic device 200 are joined together via a connector module 600 and face each other, according to an embodiment of the disclosure.

FIG. 9 is a perspective view illustrating a state in which a first electronic device 100 and a second electronic device 200 are joined together via a connector module 600 and face each other, according to an embodiment of the disclosure.

Referring to FIG. 9, a first electronic device 100, a second electronic device 200, and a connector module 600 may be the whole or part of the first electronic device 100, the second electronic device 200, and the connector module 300, 400, or 500 of FIGS. 3, 4A, 4B, 4C, 5A, 5B, 6A, 6B, 6C, 7A, 7B, and 8.

Referring to FIG. 9, the electronic device 10 may include the first electronic device 100 with an opened recess (e.g., the recess 120 of FIG. 3), the connector module 600 disposed inside the recess 120, and the second electronic device 200. The first electronic device 100 and the second electronic device 200 may be in the state of being electrically connected via the connector module 600, and while the electronic device 10 is not in use but stored or carried, they may remain in the folded position. For example, the display part (e.g., the transparent window 201 of FIG. 1) of the second electronic device 200 may be placed to overall face the first surface (e.g., the first surface 101 of FIG. 1) of the first electronic device 100.

According to an embodiment of the disclosure, a plurality of friction pads (e.g., friction pads 109 of FIG. 1) are disposed on the first surface 101 of the first electronic device 100. For example, the plurality of friction pads 109 may contain rubber or other elastic materials, and the plurality of friction pads 109 may prevent a slip between the first electronic device 100 and the second electronic device 200 and impart a predetermined gap therebetween, placing them in stable arrangement against impacts. As another example, magnets may be provided inside the first electronic device 100 and the second electronic device 200 in the positions corresponding to the plurality of friction pads 109. The plurality of magnets embedded in the first electronic device 100 and the second electronic device 200 may assist in mutual stable arrangement by their magnetic attraction.

According to an embodiment of the disclosure, as set forth above in connection with FIGS. 5 to 8, some portions (e.g., the second portion 412 and the third portion 413) of the first unfoldable part 310 in the connector module 400, 500, or 600 may rotate around different axes (e.g., the first virtual axis P1 and the second virtual axis P2), the second electronic device 200 may move towards the first surface 101 of the first electronic device 100 in the opposite direction of the unfolding direction. The second portion 412 or third portion 413 of the first unfoldable part 410 may rotate about the first portion 411 in a range from 0 degrees to 270 degrees.

For example, as the angle of the second portion 412 about the first portion 411 and the angle of the third portion 413 about the second portion 412 reduce as reverse to the first unfolding operation M1, the rotation may proceed in the reverse order of the first operation M11 and the second operation M12. If the second unfolding operation M2 has already been done, the angle of the fourth portion 414 about the third portion 413 may decrease, allowing them to rotate in the reverse order of the third operation M13. The first operation M11, the second operation M12, and/or the second unfolding operation M2 may be performed in reverse order or simultaneously. The second electronic device 200 may fully be folded on the first electronic device 100.

Details of each operation are the same as those described above, and the above-described configuration and operation for unfolding may apply here.

As set forth above, according to an embodiment of the disclosure, in the portable electronic device 10, the first electronic device 100 and the second electronic device 200 may be coupled together via the unfoldable connector module 600, and the angle of coupling may be varied as the user desires. Since the connector module 600 is inserted and placed in an inner space of the recess of the first electronic device 100 while carrying the electronic device, as the first electronic device 100 is viewed from above the front and/or side surface, the connector module 600 may be implemented seamlessly from each area of the housing, thereby achieving a simplified structure. Therefore, the electronic device may remain tidy and seamless overall.

According to an embodiment of the disclosure, an electronic device may comprise a housing including a first surface facing in a first direction and a second surface facing in a second direction which is an opposite direction of the first direction, the housing including a recess formed in a side of the first surface and opened at least in the first direction and a connector module disposed in the recess of the housing and having at least a portion unfoldable to an outside of the recess to electrically connect with an external electronic device.

The connector module may include an unfoldable part having a first portion coupled to an inside of the recess and a second portion unfolded to the outside of the recess as at least one rotating part rotates, a magnet disposed in the unfoldable part, at least one metal piece disposed opposite the magnet and configured to induce a magnetic coupling with the magnet, and a connector part exposed to the outside to connect with the external electronic device as the unfoldable part unfolds.

According to an embodiment of the disclosure, the unfoldable part may include a plurality of portions supporting the connector module and a plurality of rotating parts formed between the portions, and each of the rotating parts may unfold at least part of the connector module to the outside of the recess and reverse a position of the connector part as unfolding multiple times.

According to an embodiment of the disclosure, the connector part may be disposed in a first area of the connector module, and the magnet may be disposed in each of second areas positioned at both sides of the first area of the connector module.

According to an embodiment of the disclosure, the electronic device may be configured to perform a first unfolding operation in which the connector module expands from the recess and the connector part is exposed to be coupled to the external electronic device and a second unfolding operation in which a portion of the connector module is rotated around one axis and separated and an angle between the separated second portion is adjusted.

According to an embodiment of the disclosure, the electronic device may further include a support configured to support at least a portion of the unfoldable part to be fastened to an inside of the recess and to calibrate a height with respect to internal parts of the connector module.

According to an embodiment of the disclosure, the unfoldable part may include a first unfoldable part including at least one metal piece and exposed to the outside and a second unfoldable part extending from the first unfoldable part, and along with the first unfoldable part, forming an inner space where the magnet and the connector part are mounted.

According to an embodiment of the disclosure, the first unfoldable part may include a first portion coupled with the support, a second portion extending from the first portion and rotating about the first portion through a first rotating part, a third portion extending from the second portion and rotating about the second portion through a second rotating part, and a fourth portion coupled with the second unfoldable part.

According to an embodiment of the disclosure, the second unfoldable part may include a first portion coupled with the fourth portion of the first unfoldable part, a second portion extending from the first portion and having at least one hole to expose a contact part of the connector part, and a third portion extending from the second portion and coupled with the support.

According to an embodiment of the disclosure, the metal piece may include a first metal piece disposed inside the first unfoldable part and a second metal piece disposed on an upper surface of the recess, and the first metal piece and the second metal piece may be disposed opposite each other with the magnet disposed therebetween.

According to an embodiment of the disclosure, the first unfoldable part and the second unfoldable part may be formed of a material including plastic or fabric.

According to an embodiment of the disclosure, the first unfoldable part may have a first virtual axis disposed in a lengthwise direction of the first rotating part, the second portion rotating around the first virtual axis relative to the first portion, and have a second virtual axis disposed in a lengthwise direction of the second rotating part, the third portion rotating around the second virtual axis relative to the second portion.

According to an embodiment of the disclosure, the first unfoldable part may have a third virtual axis disposed in a lengthwise direction of the third rotating part, the fourth portion rotating around the third virtual axis relative to the third portion.

According to an embodiment of the disclosure, the second unfoldable part may have at least one opening in the position facing the contacts so that the plurality of contacts may be exposed to the outside, and the magnet may be disposed over the first area and the second area to induce a magnetic attraction with a first metal piece at least partially disposed in the first area of the connector module and second metal pieces disposed in the second areas positioned at both sides of the first area.

According to an embodiment of the disclosure, the connector part may include a printed circuit board configured to provide an electrical connection with the external electronic device and a contact part disposed on the printed circuit board and projecting to the outside.

According to an embodiment of the disclosure, the contact part may include a plurality of contacts configured to form an electrical contact with the external electronic device, and at least part of the second unfoldable part may be formed with at least one opening in a position facing the plurality of contacts to expose the plurality of contacts to the outside.

According to an embodiment of the disclosure, the magnet may be disposed over the first area and the second area to induce a magnetic attraction with a first metal piece at least partially disposed in the first area of the connector module and second metal pieces disposed in the second areas positioned at both sides of the first area.

According to an embodiment of the disclosure, in the first unfolding operation, the second portion or the third portion of the first unfoldable part may be positioned on the same plane as the second surface of the housing, and the connector part disposed on an upper surface of the second portion may be exposed to face in the first direction.

According to an embodiment of the disclosure, in the second unfolding operation, the second unfoldable part may form an inclined angle to have a predetermined slope with respect to the second portion of the first unfoldable part, and at least one magnet disposed inside the second portion of the first unfoldable part may be spaced apart from a magnet disposed inside the second unfoldable part.

According to an embodiment of the disclosure, the first unfoldable part and the second unfoldable part may be disposed over the first area and the second areas to correspond to the lengthwise direction of the recess, and the first metal piece may be disposed inside the first unfoldable part over the first area and the second areas.

According to an embodiment of the disclosure, an electronic device may comprise a housing including a first surface facing in a first direction and a second surface facing in a second direction which is an opposite direction of the first direction, the housing including a recess formed in a side of the first surface and opened at least in the first direction and a connector module disposed in the recess of the housing and having at least a portion unfoldable to an outside of the recess to electrically connect with an external electronic device, wherein the connector module may include an unfoldable part having a first portion coupled to an inside of the recess and a second portion unfolded to the outside of the recess as at least one rotating part rotates, a first magnetic body disposed in the unfoldable part, a second magnetic body disposed opposite the magnet and configured to induce a magnetic coupling with the first magnetic body, and a connector part exposed to the outside to connect with the external electronic device as the unfoldable part unfolds, and at least one hole is formed in an area abutting the recess in the first surface of the housing.

According to an embodiment of the disclosure, an electronic device may comprise a first electronic device including a display, a housing including a first surface facing in a first direction and a second surface facing in a second direction which is an opposite direction of the first direction, the housing including a recess formed in a side of the first surface and opened at least in the first direction, and a connector module disposed in the recess of the housing and having at least a portion unfoldable to an outside of the recess to electrically connect with the first electronic device, wherein the connector module may include an unfoldable part partially unfolding to the outside of the recess as at least one rotating part rotates, a magnet disposed in the unfoldable part, at least one metal piece disposed opposite the magnet and configured to induce a magnetic coupling with the magnet, and a connector part exposed to the outside to connect with the external electronic device as the unfoldable part unfolds.

As is apparent from the foregoing description, according to an embodiment of the disclosure, in an electronic device with a connector module, the connector module may be configured to reside inside the electronic device to avoid exposure to the outside of the electronic device, achieving a simple and tidy design.

According to an embodiment of the disclosure, an electronic device with a connector module may be made as seamless as possible on its outside surface, providing the user with a stable grip while carrying the electronic device.

According to an embodiment of the disclosure, an electronic device with a connector module may easily be unfolded over multiple times, enabling a coupling with an electronic device with a display unit and convenient rotation and angle adjustment.

It is apparent to one of ordinary skill in the art that the camera modules according to various embodiments of the disclosure as described above are not limited to the above-described embodiments and those shown in the drawings, and various changes, modifications, or alterations may be made thereto without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a housing including:
  a first surface facing in a first direction,
  a second surface facing in a second direction which is an opposite direction of the first direction, and
  a recess formed in a side of the first surface and opening at least in the first direction; and
 a connector module disposed in the recess of the housing and having at least a portion unfoldable to an outside of the recess to electrically connect with an external electronic device,
 wherein the connector module includes:
  an unfoldable part having a first portion coupled to an inside of the recess and a second portion unfolded to the outside of the recess as at least one rotating part rotates,
  a magnet disposed in the unfoldable part,
  at least one metal piece disposed in the unfoldable part opposite the magnet and inducing a magnetic coupling with the magnet, and a connector part exposed to the outside of the recess to connect with the external electronic device when the unfoldable part is unfolded.

2. The electronic device of claim 1,
wherein the unfoldable part includes a plurality of portions supporting the connector module and a plurality of rotating parts formed between the plurality of portions, and
wherein each of the rotating parts unfolds at least part of the connector module to the outside of the recess and reverses a position of the connector part as unfolded multiple times.

3. The electronic device of claim 1,
wherein the connector part is disposed in a first area of the connector module, and
wherein the magnet is disposed in each of second areas positioned at both sides of the first area of the connector module.

4. The electronic device of claim 3, wherein the connector module performs at least one of:
a first unfolding operation in which the connector module expands from the recess and the connector part is exposed to be coupled to the external electronic device, or
a second unfolding operation in which the second portion of the connector module is rotated around one axis and separated and an angle between the separated second portion is adjusted.

5. The electronic device of claim 4, wherein the connector module further includes a support for:
supporting at least the first portion of the unfoldable part to be fastened to an inside of the recess, and
calibrating a height with respect to internal parts of the connector module.

6. The electronic device of claim 5,
wherein the unfoldable part includes a first unfoldable part including the at least one metal piece and exposed to the outside, and a second unfoldable part extending from the first unfoldable part, and
wherein the first unfoldable part forms an inner space where the magnet and the connector part are mounted.

7. The electronic device of claim 6, wherein the first unfoldable part includes:
a first portion coupled with the support,
a second portion extending from the first portion and rotating about the first portion through a first rotating part,
a third portion extending from the second portion and rotating about the second portion through a second rotating part, and
a fourth portion coupled with the second unfoldable part.

8. The electronic device of claim 7, wherein the second unfoldable part includes:
a first portion coupled with the fourth portion of the first unfoldable part,
a second portion extending from the first portion and having at least one hole exposing a contact part of the connector part, and
a third portion extending from the second portion and coupled with the support.

9. The electronic device of claim 8, wherein the first unfoldable part and the second unfoldable part are formed of a material including plastic or fabric.

10. The electronic device of claim 9,
wherein the first unfoldable part includes a first virtual axis disposed in a lengthwise direction of the first rotating part,
wherein the second portion rotates around the first virtual axis relative to the first portion, and has a second virtual axis disposed in a lengthwise direction of the second rotating part, and
wherein the third portion rotates around the second virtual axis relative to the second portion.

11. The electronic device of claim 10,
wherein the first unfoldable part includes a third virtual axis disposed in a lengthwise direction of a third rotating part, and
wherein the fourth portion rotates around the third virtual axis relative to the third portion.

12. The electronic device of claim 7, wherein, in the first unfolding operation, the second portion or the third portion of the first unfoldable part is positioned on a same plane as the second surface of the housing, and the connector part disposed on an upper surface of the second portion is exposed to face in the first direction.

13. The electronic device of claim 12,
wherein, in the second unfolding operation, the second unfoldable part forms an inclined angle to have a predetermined slope with respect to the second portion of the first unfoldable part, and
wherein at least one magnet disposed inside the second portion of the first unfoldable part is spaced apart from a magnet disposed inside the second unfoldable part.

14. The electronic device of claim 6,
wherein the at least one metal piece includes a first metal piece disposed inside the first unfoldable part and a second metal piece disposed on an upper surface of the recess, and
wherein the first metal piece and the second metal piece are disposed opposite each other with the magnet disposed therebetween.

15. The electronic device of claim 6, wherein the connector part includes:
a printed circuit board to provide an electrical connection with the external electronic device, and
a contact part disposed on the printed circuit board and projecting to an outside of the connector part.

16. The electronic device of claim 15,
wherein the contact part includes a plurality of contacts for forming an electrical contact with the external electronic device, and
wherein at least part of the second unfoldable part is formed with at least one opening in a position facing the plurality of contacts to expose the plurality of contacts to the outside of the connector part.

17. The electronic device of claim 15,
wherein the magnet is disposed over the first area and the second areas to induce a magnetic attraction with a first metal piece at least partially disposed in the first area of the connector module, and
wherein second metal pieces are disposed in the second areas positioned at both sides of the first area.

18. The electronic device of claim 17,
wherein the first unfoldable part and the second unfoldable part are disposed over the first area and the second areas to correspond to a lengthwise direction of the recess, and
wherein the first metal piece is disposed inside the first unfoldable part over the first area and the second areas.

19. An electronic device comprising:
a housing including a first surface facing in a first direction, a second surface facing in a second direction which is an opposite direction of the first direction, and a recess formed in a side of the first surface and opening at least in the first direction; and
a connector module disposed in the recess of the housing and having at least a portion unfoldable to an outside of the recess to electrically connect with an external electronic device,
wherein the connector module includes:
  an unfoldable part having a first portion coupled to an inside of the recess and a second portion unfoldable to the outside of the recess as at least one rotating part rotates,
  a first magnetic body disposed in the unfoldable part,
  a second magnetic body disposed opposite the first magnetic body and inducing a magnetic coupling with the first magnetic body, and
  a connector part exposed to the outside of the recess to connect with the external electronic device when the unfoldable part is unfolded, and
wherein at least one hole is formed in an area abutting the recess in the first surface of the housing.

20. An electronic device comprising:
a first electronic device including a display;
a housing including a first surface facing in a first direction, a second surface facing in a second direction which is an opposite direction of the first direction, and a recess formed in a side of the first surface and opening at least in the first direction; and
a connector module disposed in the recess and having at least a portion unfoldable to an outside of the recess to electrically connect with the first electronic device,
wherein the connector module includes:
  an unfoldable part partially unfolding to the outside of the recess as at least one rotating part rotates,
  a magnet disposed in the unfoldable part,
  at least one metal piece disposed opposite the magnet and inducing a magnetic coupling with the magnet, and
  a connector part exposed to the outside of the recess to connect with the first electronic device when the unfoldable part is unfolded.

* * * * *